(12) United States Patent
Agrawal et al.

(10) Patent No.: US 11,763,115 B1
(45) Date of Patent: Sep. 19, 2023

(54) SYSTEM COMMUNICATION IN AREAS OF LIMITED NETWORK CONNECTIVITY

(71) Applicant: INTERNATIONAL BUSINESS MACHINES CORPORATION, Armonk, NY (US)

(72) Inventors: Tushar Agrawal, West Fargo, ND (US); Atul Mene, Morrisville, NC (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/815,579

(22) Filed: Jul. 28, 2022

(51) Int. Cl.
  *G06K 7/14* (2006.01)
  *G05B 19/042* (2006.01)
  *G06K 1/12* (2006.01)

(52) U.S. Cl.
  CPC ......... *G06K 7/1417* (2013.01); *G05B 19/042* (2013.01); *G06K 1/121* (2013.01); *G05B 2219/50391* (2013.01)

(58) Field of Classification Search
  CPC .... G06K 7/1417; G06K 1/121; G05B 19/042; G05B 2219/50391
  See application file for complete search history.

(56) References Cited

U.S. PATENT DOCUMENTS

| | | | |
|---|---|---|---|
| 9,313,138 B2 | 4/2016 | Sun | |
| 10,846,873 B2 | 11/2020 | Versace | |
| 2016/0121487 A1 | 5/2016 | Mohan | |
| 2018/0107969 A1* | 4/2018 | Trivelpiece | ............ B25J 9/1679 |
| 2021/0373576 A1 | 12/2021 | Sohn | |

FOREIGN PATENT DOCUMENTS

| | | |
|---|---|---|
| DE | 202020105395 U1 | 12/2020 |
| KR | 102189591 B1 | 12/2020 |
| KR | 20210091923 A | 7/2021 |

OTHER PUBLICATIONS

Chen et al., "Securing Emergent Behaviour in Swarm Robotics", arXiv:2102.03148v1 [cs.RO] Feb. 8, 2021, pp. 1-17.

(Continued)

*Primary Examiner* — Laura A Gudorf
(74) *Attorney, Agent, or Firm* — Tihon Poltavets (57) ABSTRACT

A method includes deploying a first robotic system in an area with at least limited network connectivity for communications with a plurality of robotic systems, where in the first robotic system is assigned to perform a task in the area. The method includes recording findings in a subarea of the area, wherein the findings include environmental data and operational data associated with the first robotic system. In response to determining a QR code is present for the subarea of the area, the method includes comparing stored findings associated with a second robotic system from the plurality of robotic system for the QR code present in the subarea of the area. In response to determining the recording findings include new findings compared to the stored findings, the method includes updating, via the QR code, the stored findings with the recordings finds by replacing with the new findings and a timestamp.

20 Claims, 6 Drawing Sheets

(56) References Cited

OTHER PUBLICATIONS

Disclosed Anonymously, "Method and system for robotic ecosystem to invest some percentage of time & resources to discover new way to perform", https://ip.com/IPCOM/000258932, IPCOM000258932D, Jun. 27, 2019, pp. 1-6.
https://qrcode.meetheed.com/question3.php, "QR Codes—How Many Characters/Digits Can A QR Code Store?" Feb. 2017, pp. 1-3.
https://qrcode.meetheed.com/question7.php?s=s, "QR Codes—How Much Data Can A QR Code Store?", Accessed Mar. 2, 2022, pp. 1-4.
https://stlpartners.com/edge-computing/edge-computing-companies-2020/, "15 Edge computing companies to watch in 2020", STL Partners, 2017, pp. 1-15.
IBM, "IBM solutions for 5G and edge computing", https://www.ibm.com/cloud/edge-computing, Accessed Mar. 2, 2022 pp. 1-12.
IBM, "ICO Robotics—Robotics@IBM", https://w3.ibm.com/w3publisher/ico-robotics, 2021, pp. 1-5.
Makris et al., "Cooperating Robots for Reconfigurable Assembly Operations: Review and Challenges", https://www.sciencedirect.com/science/article/pii/S2212827112002326, Elsevier, SciVerse ScienceDirect, Procedia CIRP 3. 2012, pp. 346-351.
Mell et al., "The NIST Definition of Cloud Computing", National Institute of Standards and Technology, Special Publication 800-145, Sep. 2011, pp. 1-7.
Zielinski et al., "Communication Within Multi-FSM Based Robotic Systems", Springer, Journal of Intelligent & Robotic Systems, https://link.springer.com/article/10.1007/s10846-018-0869-6, 2019, 93: pp. 787-805.

\* cited by examiner

SYSTEM COMMUNICATION IN AREAS OF LIMITED NETWORK CONNECTIVITY

BACKGROUND

This disclosure relates generally to communications between systems, and in particular to communications between systems in areas of limited network connectivity.

A disaster area can utilize various autonomous or semi-autonomous systems for deployment into a remote area with limited to no network connectivity to assist personnel with a specific task. Such autonomous or semi-autonomous systems typically operate in a collaborative manner, allowing for an exchanging of information to perform the task within the remote area. However, the collaborative manner of sharing data and information between the systems is constrained if there is limited to no network connectivity and if one system is not located in a vicinity of another system to utilize short range communication to share the data and the information.

SUMMARY

Embodiments in accordance with the present invention disclose a method, computer program product and computer system for QR code-based communications between robotic systems, the method, computer program product and computer system can deploy a first robotic system in an area with at least limited network connectivity for communications with a plurality of robotic systems, wherein the first robotic system is assigned to perform a task in the area. The method, computer program product and computer system can record, at the first robotic system, a first set of findings in a first subarea of the area. The method, computer program product and computer system can, responsive to determining a QR code is not present for the first subarea of the area, generate, at the first robotic system, a first QR code for the first subarea, wherein the first QR code includes the first set of findings in the first subarea of the area by the first robotic system. The method, computer program product and computer system can print, at the first robotic system, the first QR code for placement in the first subarea of the area.

DETAILED DESCRIPTION

Figure 1:
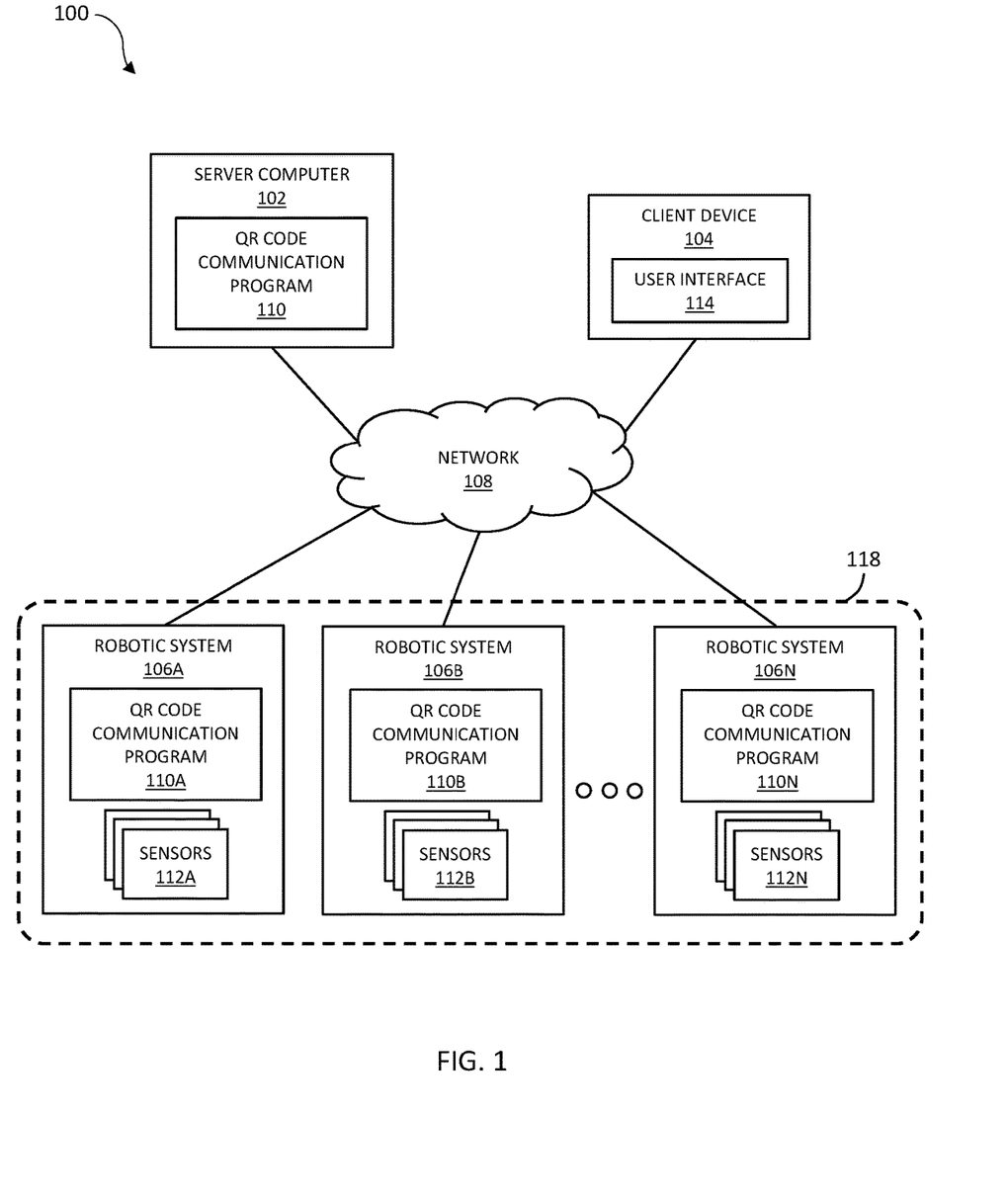
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 102, client device 104, and robotic system 106A, 106B, and 106N all interconnected over network 108. It is to be noted, robotic system 106N represents the $n^{th}$ robotic system 106 (e.g., $5^{th}$) operating in a collaborative environment 118. Server computer 102 can be a standalone computing device, a management server, a web server, a mobile computing device, or any programmable electronic device capable of communicating (i.e., sending and receiving data) with client device 104, robotic system 106A, 106B, and 106N, and other computing devices (not shown) within the distributed data processing environment via network 108. In other embodiments, server computer 102 can represent a server computing system utilizing multiple computers as a server system, such as in a cloud computing environment. In another embodiment, server computer 102 represents a computing system utilizing clustered computers and components (e.g., database server computers, application server computers, etc.) that act as a single pool of seamless resources when accessed within the distributed data processing environment. For discussion purposes, quick response (QR) code is a type of matrix barcode, also known as a two-dimensional barcode. Though the embodiments discussed herein refer to QR codes, other embodiments can utilize any two-dimension barcode capable of storing data capturable by robotic system 106A, 106B, and 106N. Server computer 102 includes server-side QR code communication program 110 for communication with system-side QR code communication program 110A, 110B, and 110N on robotic system 106A, 106B, and 106N, respectively. Server computer 102 may include internal and external hardware components, as depicted and described in further detail with respect to FIG. 4.

Client device 104 can be a laptop computer, a tablet computer, a smart phone, smartwatch, a smart speaker, or any programmable electronic device capable of communicating (i.e., sending and receiving data) with server computer 102, robotic system 106A, 106B, and 106N, and other computing devices (not shown) within the distributed data processing environment via network 108. Client device 104 can be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 108. In one embodiment, client device 104 represents one or more devices associated with a user. Client device 104 includes user interface 114 for interacting with QR code communication program 110 on sever computer 102 and QR code communication program 110A, 110B, and 110N on robotic system 106A, 106B, and 106N, respectively.

Robotic system 106A, 106B, and 106N each represent a robotic device capable of operating in an autonomous and/or semi-autonomous manner to perform a task and capable of communicating (i.e., sending and receiving data) with server computer 102, client device 104, and other computing devices (not shown) within the distributed data processing environment via network 108. Robotic system 106A, 106B, and 106N include system-side QR code communication program 110A, 110B, and 110N, respectively for communication with server-side QR code communication program 110 on server computer 102. Robotic system 106A, 106B, and 106N include sensors 112A, 112B, and 112N for collecting various environmental data and operational data while performing a task at a location (e.g., disaster location). Sensors 112A, 112B, and 112N can include an accelerometer, a gyroscope sensor, a temperature sensor, a pressure sensor, a moisture sensor, and any other sensor capable of collecting data pertaining to performing a task at a location. For instances of limited to no network connectivity, robotic system 106A, 106B, and 106N can operate in environment 118 utilizing QR code based communication via performable actions by QR code communication program 110A, 110B, and 110N, respectively.

Network 108 can be, for example, a telecommunications network, a local area network (LAN), a wide area network (WAN), such as the Internet, or a combination of the three, and can include wired, wireless, or fiber optic connections. Network 108 can include one or more wired and/or wireless networks capable of receiving and transmitting data, voice, and/or video signals, including multimedia signals that include voice, data, and video information. In general, network 108 can be any combination of connections and protocols that will support communications between server computer 102, client device 104, robotic system 106A, 106B, and 106N, and other computing devices (not shown) within the distributed data processing environment.

It is to be noted that server-side QR code communication program 110 and system-side QR code communication program 110A, 110B, and 110N can each perform at least one or all the steps as described herein. For discussion purposes, QR code communication program 110 as used hereinafter can be directed to the server-side and/or the system-side program. QR code communication program 110 facilitates communications between robotic system 106A, 106B, and 106N in areas of limited to no network connectivity. QR code communication program 110 deploys robotic systems 106A, 106B, and 106N in an area with limited to no connectivity to perform a task, where the area is represented as environment 118. QR code communication program 110 records findings (i.e., data) in a subarea of the area with limited to no connectivity and QR code communication program 110 determines whether a designated QR code is present for the subarea. In the event QR code communication program 110 determines a designate QR code is not present for the subarea, QR code communication program 110 generates a QR code for the subarea and stores recorded finding for the area.

In the event QR code communication program 110 determines a designated QR code is present for the subarea, QR code communication program 110 scans the QR code for the subarea. QR code communication program 110 compares the stored findings associated with the scanned QR code to the recorded findings. QR code communication program 110 determines whether new findings are present between the stored findings and the recorded findings. In the event QR code communication program 110 determines there are new finds present between the stored findings and the recorded findings, QR code communication program 110 updates the stored findings with the recorded findings and determines whether to continue the deployment. In the event QR code communication program 110 determines there are no new finds present between the stored findings, QR code communication program 110 determines whether to continue the deployment. In the event QR code communication program 110 determines to continue the deployment, QR code communication program 110 reverts to recording findings in a subarea of the area with limited to no network connectivity. In the event QR code communication program 110 determines to continue the deployment, QR code communication program 110 ceases operations.

User interface 114 enables a user to make requests of or issue commands to server computer 102, client device 104, robotic system 106A, 106B, and 106N via network 108. User interface 114 also enables the user to receive information and instructions in response on client device 104 via network 108. In one embodiment, a user of client device 104 accesses user interface 114 via voice commands in natural language. In another embodiment, user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 114 enables a user of client device 104 to interact with an instance of QR code communication program 110 operating on server computer 102 and QR code communication program 110A, 110B, and 110C operating on robotic system 106A, 106B, and 106N, respectively.

Figure 2:
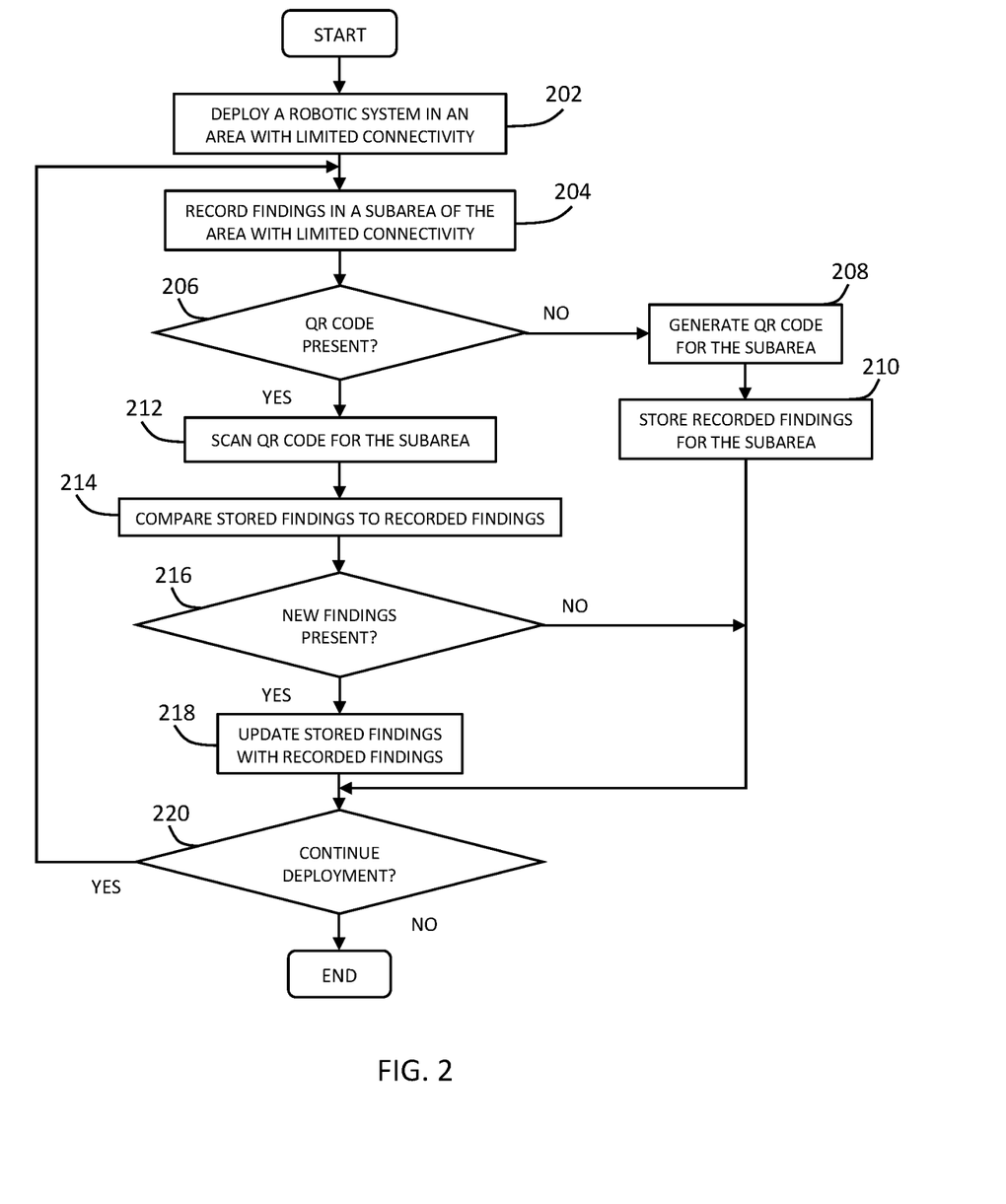
FIG. 2 depicts a flowchart for a QR code communication program for sharing data and information between robotic systems in an area with limited to no network connectivity, in accordance with an embodiment of the present invention.

FIG. 2 depicts a flowchart for a QR code communication program for sharing data and information between robotic systems in an area with limited to no network connectivity, in accordance with an embodiment of the present invention.

QR code communication program 110 deploys robotic systems in an area with limited connectivity (202). In one embodiment, QR code communication program 110 deploys multiple robotic systems in a remote area with limited or no network connectivity to perform a set of tasks (e.g., land surveying). QR code communication program 110 can deploy each of the multiple robotic systems by geofencing an area in which the multiple robotic systems are to perform the set of tasks. In another embodiment, QR code communication program 110 deploys multiple robotic systems within the confines of a structure (e.g., warehouse, office building) with limited or no network connectivity to perform tasks associated with disaster recovery operations. QR code communication program 110 can deploy the multiple robotic systems, where each of the multiple robotic systems are confide by physical boundaries (e.g., walls, stairs, doors) within the structure. As previously mentioned, QR code communication program 110 operates remotely on a server and locally on each of the multiple robotic systems for instances of limited or no network connectivity. QR code communication program 110 on each robotic system allows for the multiple robotic systems to operate in a collaborative manner and remote environment. QR code communication program 110 operating on a respective robotic system can identify network connectivity issues with another QR code communication program 110 operating on a remote server and can determine to utilize QR codes for robotic system to robotic system communications between local instances of QR code communication program 110 on respective robotic systems.

QR code communication program 110 records findings in a subarea of the area with limited connectivity (204). For each robotic system, QR code communication program 110 records findings in a subarea of the area with the limited connectivity. The recorded findings can include environmental data and/or operational data associated with the respective robotic system. Environmental data can include temperature readings, humidity readings, seismic reading, and wind readings. Operational data can include internal temperature readings, battery life readings, system statuses, and Global Positioning System (GPS) coordinates. In one embodiment, each robotic systems from the multiple robotic systems performs a unique task that can include performing an action (e.g., cleaning operation, lifting operation) and/or collecting data via one or more sensors or camera. In another embodiment, the multiple robotic systems perform at least one similar task that can include performing an action and/or collecting data via one or more sensors or camera. In one example, QR code communication program 110 records findings that included captured data with moisture levels and temperature readings from sensors on a robotic system. In another example, QR code communication program 110 records findings that include the completion of a task by a first robotic system of moving debris in the subarea into a single location for collection by a second robotic system.

QR code communication program 110 determines whether a designated QR code is present for the subarea (decision 206). The designate QR code is produced by QR code communication program 110 for each robotic system that records findings, along with a timestamp and signature associated with the specific robotic system that produced the recorded findings. In one embodiment, QR code communication program 110 can activate a camera on a respective robotic system to scan for the designated QR codes previously deployed on a surface in the subarea. In another embodiment, QR code communication program 110 utilizes a near field communication (NFC) reader to scan for an NFC chip associated with the designated QR code deployed in the subarea. Subsequent to scanning an NFC chip, QR code communication program 110 activates a camera on the respective robotic system to scan the designated QR code. In the event QR code communication program 110 determines a designate QR code is not present for the subarea ("no" branch, decision 206), QR code communication program 110 generates a QR code for the subarea (208). In the event QR code communication program 110 determines a designated QR code is present for the subarea ("yes" branch, decision 206), QR code communication program 110 scans the QR code for the subarea (212).

QR code communication program 110 generates a QR code for the subarea (208) and stores recorded finding for the subarea (210). QR code communication program 110 generates a QR code for the subarea with the recorded findings for a specific robotic system and locally stores the recorded findings for the subarea on the specific robotic system. In addition to generating the QR code, QR code communication program 110 prints the generated QR code with moisture resistance ink on a moisture resistance material on a moisture resistance material and deploys the generated QR code onto a surface in the subarea, wherein the generated QR code is scannable by QR code communication program 110 operating on another robotic system that enters the subarea. The moisture resistance material is such that environmental elements (e.g., rain, sleet, snow, direct sunlight) do not damage nor distort the generated QR code printed on the moisture resistance material. The moisture resistance material can be biodegradable, where the moisture resistance material safely dissolves into a surrounding environment after a predetermined amount of time (e.g., three to six months). In some embodiments, the moisture resistance material can further include an embedded near field communication (NFC) chip that is scannable by QR code communication program 110 operating on a robotic system. QR code communication program 110 can continuously scan for NFC chips while operating in a subarea to identify QR codes deployed onto a surface in the subarea and subsequent to scan an NFC chip, QR code communication program 110 can activate a camera on the robotic system to scan the generated QR code on the moisture resistance material deployed onto a surface in the subarea.

QR code communication program 110 scans the QR code for the subarea (212). QR code communication program 110 scans the QR code for the subarea utilizes a camera on a respective robotic system. QR code communication program 110 accesses the stored findings and QR code communication program 110 compares the stored findings associated with the scanned QR code to the recorded findings (214). In one embodiment, QR code communication program 110 compares the stored findings to the recorded findings to identify any deviations, where the deviations in the recorded findings represent new findings. In another embodiment, QR code communication program 110 compares a time stamp and/or a robotic system signature for the stored findings and the recorded findings to determine where new findings are present. For example, QR code communication program 110 can utilize a time-based recording refresh threshold for which QR code communication program 110 updates the stored findings with the recorded findings. In another example, QR code communication program 110 can utilize robotic system based recording refresh threshold for which QR code communication program 110 updates the stored findings with the recorded findings, where readings from a first robotic system take priority over a second robotic system when updating stored findings with the recorded findings.

QR code communication program 110 determines whether new findings are present between the stored findings and the recorded findings (decision 216). In the event QR code communication program 110 determines there are new finds present between the stored findings and the recorded findings ("yes" branch, decision 216), QR code communication program 110 updates the stored findings with the recorded findings (218). In the event QR code communication program 110 determines there are no new finds present between the stored findings ("no" branch, decision 216), QR code communication program 110 determines whether to continue the deployment (decision 220).

QR code communication program 110 updates the stored findings with the recorded findings (218). In one example, QR code communication program 110 replaces the stored findings with the recorded findings by generating another QR code for the subarea with the recorded finding and removing the old QR code with the stored findings from the subarea. QR code communication program 110 prints a new generate QR code with moisture resistance ink on a moisture resistance material and deploys the new generated QR code onto a surface in the subarea, wherein the new generated QR code is scannable by QR code communication program 110 operating on another robotic system that enters the subarea. The moisture resistance material can be biodegradable, where the moisture resistance material safely dissolves into a surrounding environment after a predetermined amount of time (e.g., three to six months). In one embodiment removing the old QR code can include QR code communication program 110 instructing the respective robotic system to actuate an arm to collect the old QR code from a surface in the subarea. In another embodiment where the old QR code is printed on a moisture resistant material that is biodegradable, QR code communication program 110 instructs the respective robotic system to physically alter the old QR code such that it is unreadable by a camera on another robotic system that may enter the subarea. For example, QR code communication program 110 can instruct the respective robotic system to bury or runover the old QR code until a camera on the respective robotic system can no longer read the old QR code.

QR code communication program 110 determines whether to continue the deployment (decision 220). In the event QR code communication program 110 determines to continue the deployment ("yes" branch, decision 220), QR code communication program 110 reverts to recording findings in a new subarea of the area with limited connectivity (204). In the event QR code communication program 110 determines to continue the deployment ("no" branch, decision 220), QR code communication program 110 ceases operations.

Figure 3:
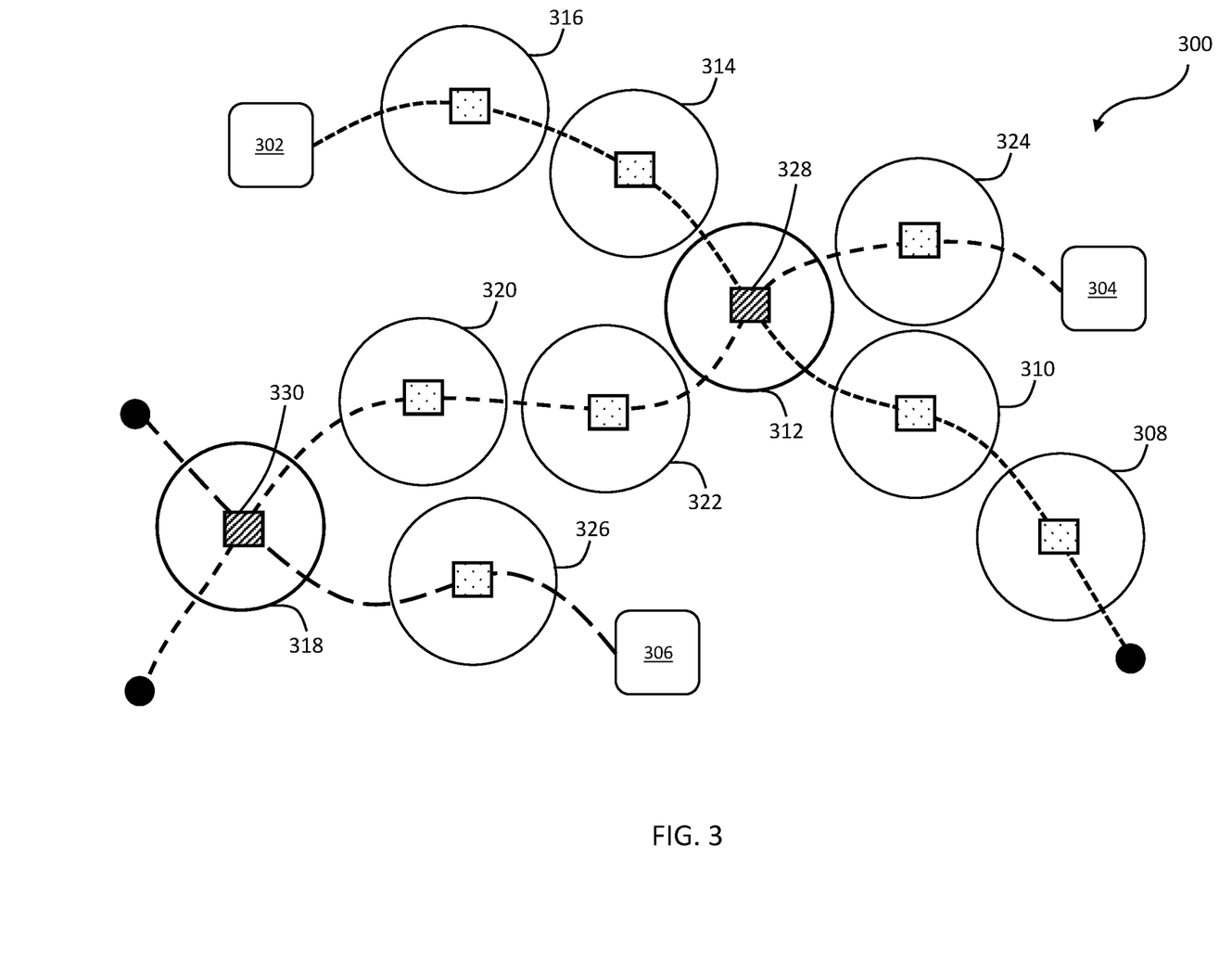
FIG. 3 depicts an example of multiple robotic systems sharing data and information in an area with limited to no network connectivity as managed by a QR code communication program, in accordance with an embodiment of the present invention.

FIG. 3 depicts an example of multiple robotic systems sharing data and information in an area with limited to no network connectivity as managed by a QR code communication program, in accordance with an embodiment of the present invention.

In this example, remote area 300 includes QR code communication program 110 operating on each of robotic system 302, 304, and 306, performing disaster recovery operations. Robotic system 302 travels along a path of subareas 308, 310, 312, 314, and 316, where QR code communication program 110 deploys robotic system 302 to subarea 308 to perform a task and record findings in subarea 308, followed by subarea 310, 312, 314, and 316. Robotic system 304 travels along a path of subarea 318, 320, 322, 312, and 324, where QR code communication program 110 deploys robotic system 304 to subarea 318 to perform a task and record findings in subarea 318, followed by subarea 320, 322, 312, and 324. Robotic system 306 travels along a path of subareas 318 and 326, where QR code communication program 110 deploys robotic system 306 to subarea 318 to perform a task and record findings in subarea 318, followed by subarea 326. In this example, QR code communication program 110 deploys robotic system 302 to subarea 312 and records findings for subarea 312 utilizing various sensors (e.g., temperature, seismic, humidity) on robotic system 302. QR code communication program 110 determines no QR code is present in subarea 312, generates QR code 328 with a timestamp and unique identifier associated with robotic system 302 for subarea 312 with the recorded findings from robotic system 302, and prints QR code 328 for placement on a surface in subarea 312. Subsequently, QR code communication program 110 deploys robotic system 304 to subarea 312 to perform a task and records new findings in subarea 318 utilizing various sensors on robotic system 304. QR code communication program 110 determines QR code 328 is present in subarea 312, generates a new QR code 328 for the new findings with a new timestamp and a unique identifier associated robotic system 304 for subarea 312. QR code communication program 110 prints the new QR code 328 for placement on a surface in subarea 312 and instructs robotic system 304 to dispose of the old QR code 328 left by robotic system 302.

QR code communication program 110 deploys both, robotic system 304 and robotic system 306, to subarea 318 to perform a task and record findings for subarea 318 utilizing various sensors on robotic system 304 and 306. QR code communication program 110 can establish priority between robotic system 304 and 306, where readings from robotic system 306 are prioritized over robotic systems 304 due to sensor reading discreteness that QR code communication program 110 identifies with at least one sensor on robotic system 304. QR code communication program 110 determines no QR code is present in subarea 318, generates QR code 330 with a timestamp and unique identifier associated with robotic system 306 for subarea 318 with the recorded findings from robotic system 306, and prints QR code 330 for placement on a surface in subarea 318.

In an area with limited or no network connectivity, embodiments of the present invention facility the communication between various robotic systems operating within the area. Embodiments of the present invention can predict and anticipate connectivity issues with a remote server with and proactively generate QR codes to facilitate communication between multiple robotic systems in the area with the limited or nor network connectivity. The QR codes contain information, such as, data attributes relating to physical location, challenges, activities completed. Embodiments of the present invention can generate the QR codes without utilizing a communication network for communications with a remote server. As a robotic system travels into a limited or no network connectivity area, embodiments of the present invention generate a QR code and any subsequent robotic system entering can read the information left by a previous robotic system. Once the information is read, consumed, and acted upon, embodiments of the present invention can erase the QR code and generate another one with newer information after finishing one or more tasks.

Embodiments of the present invention facility robotic system with QR codes for information sharing. While two or more robotic systems perform activities in any disaster surrounding, (where internet connectivity is not available and the robotic systems are separated by a distance too large for direct robotic system to robotic system communications), then the robotic system can share the information with other robotic system by generating an appropriate QR code on different surfaces of the surrounding area so that other robotic system can read the QR code to get information shared by any robotic system. Embodiments of the present invention allow for digital inclusion through digital geolocational sharing with sensors, Internet of Things (IoT) beacons, and/or digital displays. Embodiments of the present invention allow for physical inclusion by generating and printing QR codes physically on labels, stickers, decals, or paper. Embodiments of the present invention provide unique QR code generation for locational data.

Embodiments of the present invention can define the location for QR code generation. While performing mobility and activity in any disaster surrounding, if any robotic system needs to share the information with other robotic system with QR code, the robotic system can identify appropriate surfaces in the area where QR code can be generated, so that other robotic system can get the information quickly and effectively. Embodiments of the present invention provide linking or chaining of existing QR codes with new QR codes. While performing mobility in the surrounding by the robotic systems, if the robotic systems arrive within a threshold distance limit, then the robotic systems can synchronize information with each other and will not be considering the QR codes which were generated before the robotic system are connected to each other.

Figure 4:
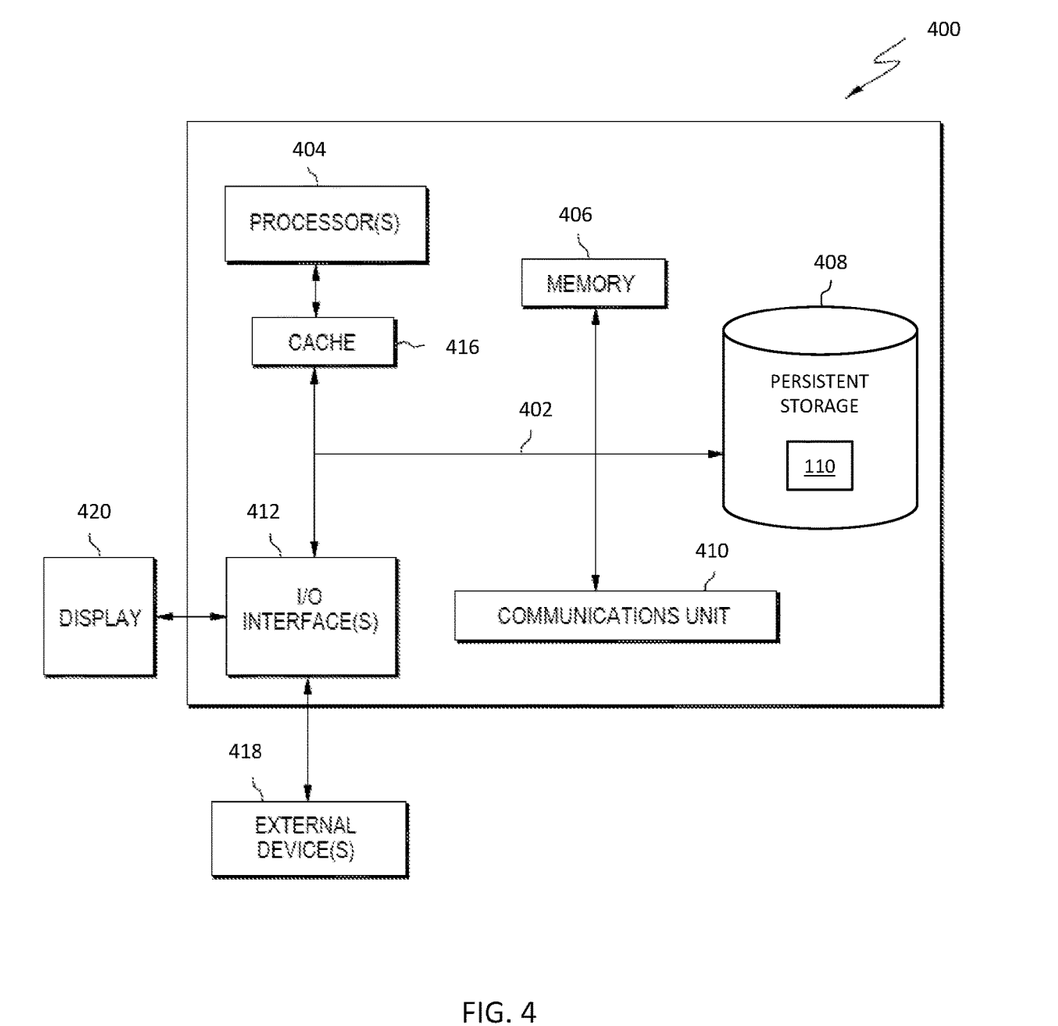
FIG. 4 is a block diagram of components of a computer system, such as the server computer of FIG. 1, in accordance with an embodiment of the present invention.

FIG. 4 depicts computer system 400, where server computer 102 is an example of a computer system 400 that includes QR code communication program 110. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
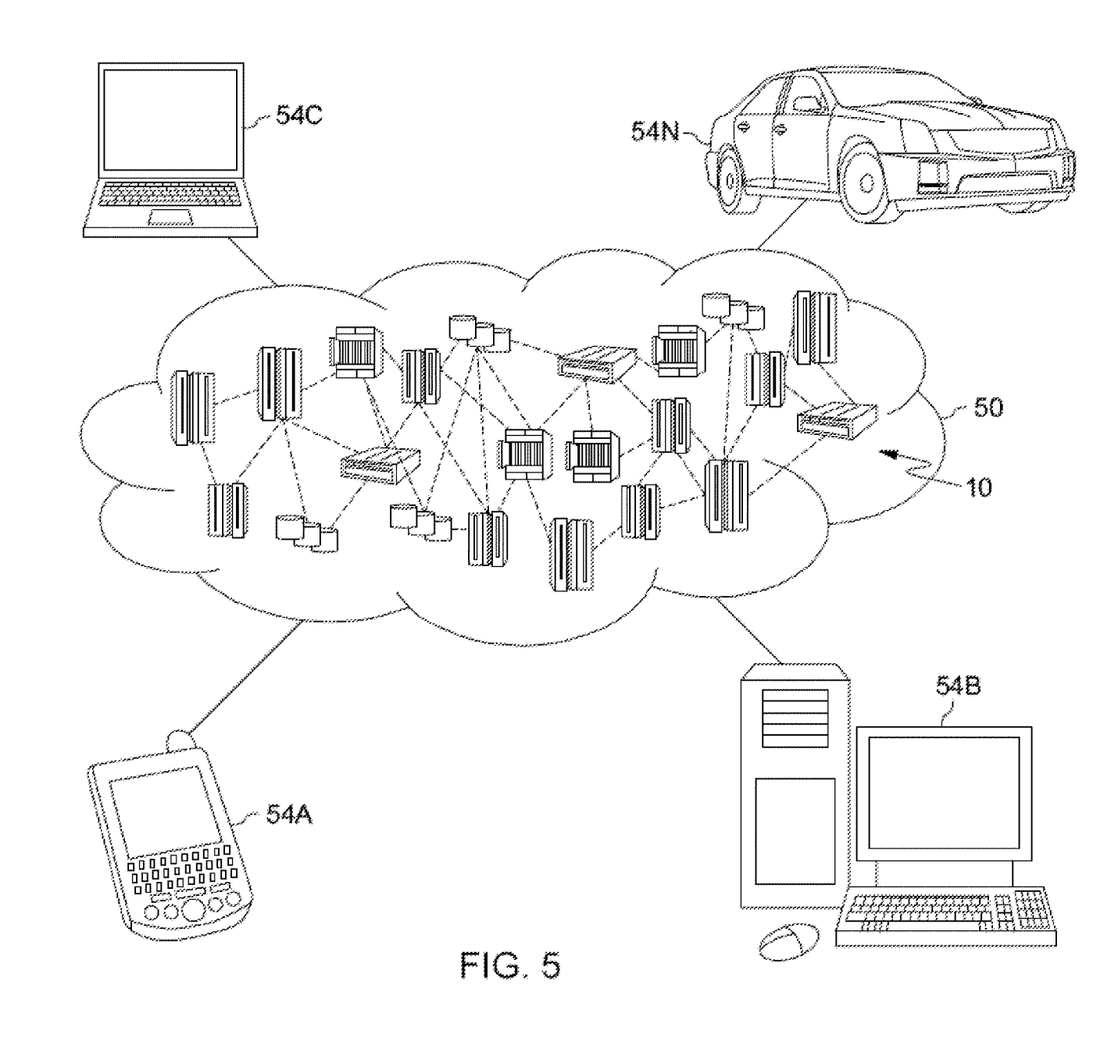
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
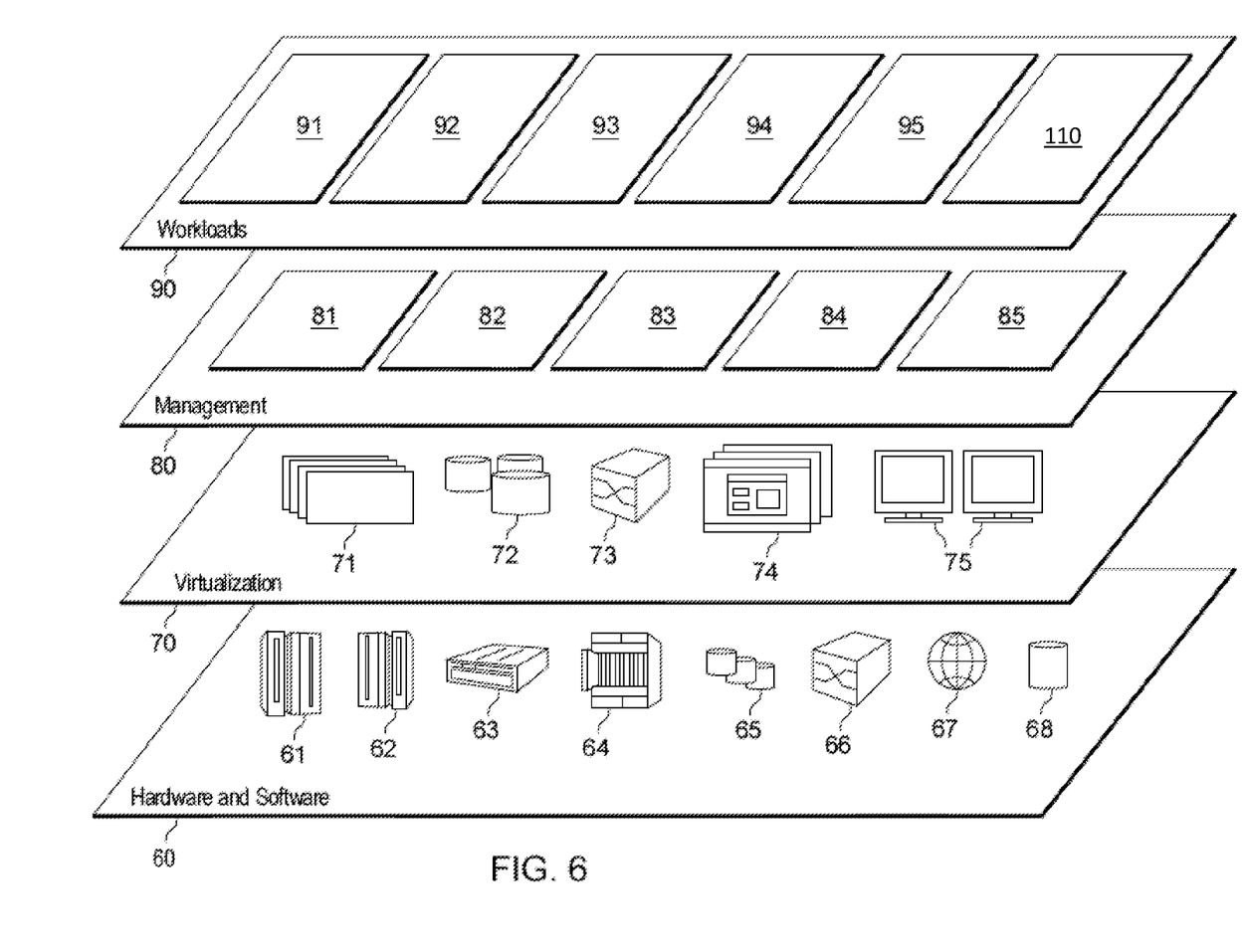
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and QR code communication program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method comprising:
   deploying a first robotic system in an area with at least limited network connectivity for communications with a plurality of robotic systems, wherein the first robotic system is assigned to perform a task in the area;
   recording, at the first robotic system, a first set of findings in a first subarea of the area;
   responsive to determining a QR code is not present for the first subarea of the area, generating, at the first robotic system, a first QR code for the first subarea, wherein the first QR code includes the first set of findings in the first subarea of the area by the first robotic system; and
   printing, at the first robotic system, the first QR code for placement in the first subarea of the area.

2. The method of claim 1, wherein the findings include environmental data and operational data associated with the first robotic system.

3. The method of claim 1, further comprising:
  recording, at the first robotic system, a second set of findings in a second subarea of the area;
  responsive to determining a QR code is present for the second subarea of the area, comparing stored findings associated with a second robotic system from the plurality of robotic system for the QR code present in the second subarea to the second set of findings in the second subarea; and
  responsive to determining the second set of findings from the first robotic system include new findings compared to the stored findings associated with the second robotic system, updating, via a second QR code, the stored findings with the second set of findings.

4. The method of claim 3, wherein updating, via the second QR code, the stored finding with the second set of findings further comprises:
  generating, at the first robotic system, the second QR code for the second subarea, wherein the second QR code includes the second set of findings in the second subarea of the area by the second robotic system; and
  printing, at the first robotic system, the second QR code for placement in the first subarea of the area.

5. The method of claim 4, further comprising:
  instructing, the first robotic system, to physically alter the QR code present for the second subarea of the area such that a camera on the first robotic system cannot capture the QR code.

6. The method of claim 1, wherein the first QR code is of a moisture resistance ink on a moisture resistance material.

7. The method of claim 6, wherein the moisture resistance material is a biodegradable material.

8. A computer program product comprising:
  one or more computer-readable storage media and program instructions stored on the one or more computer-readable storage media capable of performing a method, the method comprising:
  deploying a first robotic system in an area with at least limited network connectivity for communications with a plurality of robotic systems, wherein the first robotic system is assigned to perform a task in the area;
  recording, at the first robotic system, a first set of findings in a first subarea of the area;
  responsive to determining a QR code is not present for the first subarea of the area, generating, at the first robotic system, a first QR code for the first subarea, wherein the first QR code includes the first set of findings in the first subarea of the area by the first robotic system; and
  printing, at the first robotic system, the first QR code for placement in the first subarea of the area.

9. The computer program product of claim 8, wherein the findings include environmental data and operational data associated with the first robotic system.

10. The computer program product of claim 8, further comprising:
  recording, at the first robotic system, a second set of findings in a second subarea of the area;
  responsive to determining a QR code is present for the second subarea of the area, comparing stored findings associated with a second robotic system from the plurality of robotic system for the QR code present in the second subarea to the second set of findings in the second subarea; and
  responsive to determining the second set of findings from the first robotic system include new findings compared to the stored findings associated with the second robotic system, updating, via a second QR code, the stored findings with the second set of findings.

11. The computer program product of claim 10, wherein updating, via the second QR code, the stored finding with the second set of findings further comprises:
  generating, at the first robotic system, the second QR code for the second subarea, wherein the second QR code includes the second set of findings in the second subarea of the area by the second robotic system; and
  printing, at the first robotic system, the second QR code for placement in the first subarea of the area.

12. The computer program product of claim 11, further comprising:
  instructing, the first robotic system, to physically alter the QR code present for the second subarea of the area such that a camera on the first robotic system cannot capture the QR code.

13. The computer program product of claim 8, wherein the first QR code is of a moisture resistance ink on a moisture resistance material.

14. The computer program product of claim 13, wherein the moisture resistance material is a biodegradable material.

15. A computer system comprising:
  one or more computer processors, one or more computer-readable storage media, and program instructions stored on the one or more of the computer-readable storage media for execution by at least one of the one or more processors capable of performing a method, the method comprising:
  deploying a first robotic system in an area with at least limited network connectivity for communications with a plurality of robotic systems, wherein the first robotic system is assigned to perform a task in the area;
  recording, at the first robotic system, a first set of findings in a first subarea of the area;
  responsive to determining a QR code is not present for the first subarea of the area, generating, at the first robotic system, a first QR code for the first subarea, wherein the first QR code includes the first set of findings in the first subarea of the area by the first robotic system; and
  printing, at the first robotic system, the first QR code for placement in the first subarea of the area.

16. The computer system of claim 15, wherein the findings include environmental data and operational data associated with the first robotic system.

17. The computer system of claim 15, further comprising:
  recording, at the first robotic system, a second set of findings in a second subarea of the area;
  responsive to determining a QR code is present for the second subarea of the area, comparing stored findings associated with a second robotic system from the plurality of robotic system for the QR code present in the second subarea to the second set of findings in the second subarea; and
  responsive to determining the second set of findings from the first robotic system include new findings compared to the stored findings associated with the second robotic system, updating, via a second QR code, the stored findings with the second set of findings.

18. The computer system of claim 17, wherein updating, via the second QR code, the stored finding with the second set of findings further comprises:
  generating, at the first robotic system, the second QR code for the second subarea, wherein the second QR code includes the second set of findings in the second subarea of the area by the second robotic system; and printing, at the first robotic system, the second QR code for placement in the first subarea of the area.

19. The computer system of claim 18, further comprising:
instructing, the first robotic system, to physically alter the QR code present for the second subarea of the area such that a camera on the first robotic system cannot capture the QR code.

20. The computer system of claim 15, wherein the first QR code is of a moisture resistance ink on a moisture resistance material.

* * * * *